(12) United States Patent
Mann et al.

(10) Patent No.: US 9,022,543 B2
(45) Date of Patent: May 5, 2015

(54) PRINT METHOD, PRINT APPARATUS AND PRINTED UPON MEDIUM

(75) Inventors: Joshua A. Mann, Ramona, CA (US);
Michael R. Hupp, San Diego, CA (US);
Minedys Macias, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 312 days.

(21) Appl. No.: 13/259,111

(22) PCT Filed: Feb. 5, 2010

(86) PCT No.: PCT/US2010/023279
§ 371 (c)(1),
(2), (4) Date: Sep. 22, 2011

(87) PCT Pub. No.: WO2011/096931
PCT Pub. Date: Aug. 11, 2011

(65) Prior Publication Data
US 2013/0029116 A1 Jan. 31, 2013

(51) Int. Cl.
| | |
|---|---|
| B41J 2/01 | (2006.01) |
| B41M 5/00 | (2006.01) |
| B41J 2/21 | (2006.01) |
| C09D 11/324 | (2014.01) |
| B41M 3/00 | (2006.01) |

(52) U.S. Cl.
CPC ....... B41M 5/0023 (2013.01); Y10T 428/24851 (2015.01); B41J 2/2107 (2013.01); B41M 3/008 (2013.01); C09D 11/324 (2013.01)

(58) Field of Classification Search
CPC ............ B41J 2/01; B41J 2/2107; B41J 29/38; C09D 11/30; C09D 11/322; C09D 11/324; B41M 3/008; B41M 5/0023; Y10T 128/24851

USPC ............... 347/6, 95, 100; 106/31.6, 31.65
See application file for complete search history.

(56) References Cited

U.S. PATENT DOCUMENTS

| | | | | |
|---|---|---|---|---|
| 5,568,169 | A * | 10/1996 | Dudek et al. | 347/43 |
| 6,740,152 | B1 * | 5/2004 | Fukuda | 106/31.72 |
| 6,758,559 | B1 * | 7/2004 | Nakano et al. | 347/100 |
| 6,827,423 | B1 * | 12/2004 | Katakura et al. | 347/40 |
| 6,864,302 | B2 * | 3/2005 | Miyabayashi | 523/160 |
| 7,909,449 | B2 * | 3/2011 | Sato et al. | 347/100 |
| 8,192,009 | B2 * | 6/2012 | Yokohama et al. | 347/100 |
| 8,333,452 | B2 * | 12/2012 | Takagi et al. | 347/14 |
| 2006/0203056 | A1 * | 9/2006 | Furukawa et al. | 347/96 |
| 2008/0137147 | A1 * | 6/2008 | Nakano et al. | 358/3.06 |
| 2008/0151027 | A1 * | 6/2008 | Held et al. | 347/100 |
| 2008/0292793 | A1 * | 11/2008 | Yamashita et al. | 427/256 |
| 2009/0295847 | A1 * | 12/2009 | Mukai et al. | 347/6 |
| 2010/0277548 | A1 * | 11/2010 | Hakiri et al. | 347/54 |

* cited by examiner

*Primary Examiner* — Matthew Luu
*Assistant Examiner* — Rut Patel
(74) *Attorney, Agent, or Firm* — Rathe Lindenbaum LLP

(57) ABSTRACT

A print method, print apparatus and printed medium include forming a black portion of an image from two inks. The first ink (62) includes first carbon black pigment units (66) and a first binder (68). The first carbon black pigment units (66) have a median dibutylphthalate absortion (DBP) of at least 95 cc/100 g. The first ink (62) has a first ratio of the first carbon black pigment units to the first binder. The second ink (64) includes second carbon black pigment units and a second binder. The second ink has a second ratio of the second carbon black pigment units to the second binder less than the first ratio. The first ink and the second ink together have a median total weight per unit area of at least 70 percent of an absorptive capacity of the print medium and overlap one another, wherein the second ink is at least 54 percent of the total weight per unit area.

15 Claims, 3 Drawing Sheets

PRINT METHOD, PRINT APPARATUS AND PRINTED UPON MEDIUM

BACKGROUND

Existing inks and printing methods for forming black portions of an image may lack a sufficiently dark black point, scratch performance and/or gloss quality.

DETAILED DESCRIPTION OF THE EXAMPLE EMBODIMENTS

Figure 1:
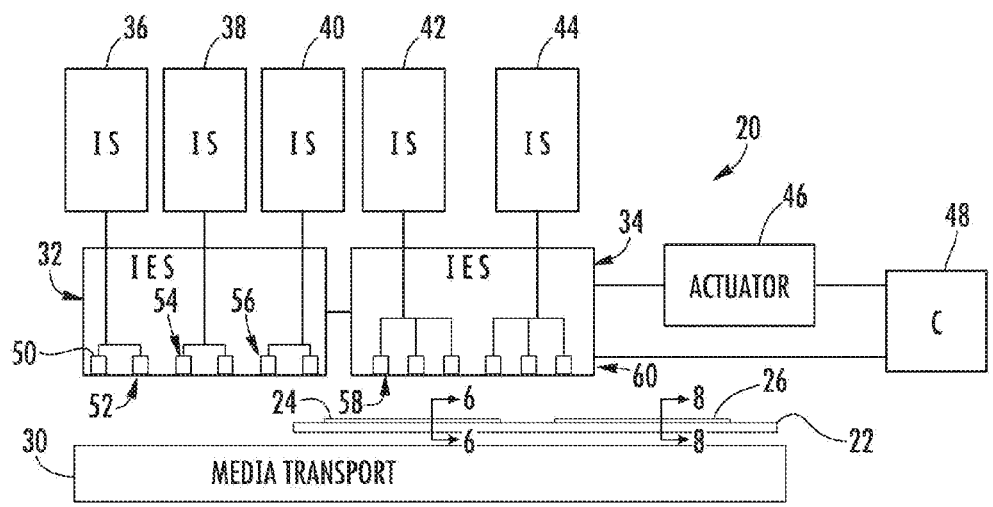
FIG. 1 is a schematic illustration of a printing system according to an example embodiment.

FIG. 1 schematically illustrates a printing system 20 according to an example embodiment. Printing system 20 is configured to deposit one or more printing inks or ink upon a print medium 22 to form one or more layers 24, 26 of the first to form images such as graphics or photos. As wilt be described hereafter, printing system 20 forms images having a sufficiently dark black point as well as other enhanced properties.

Printing system 20 includes media transport 30, ink ejection systems 32, 34, ink supplies 36, 38, 40, 42, 44, actuators 46 and controller 48. Media transport 30 comprises one or more devices configured to move and position print medium 22 with respect to ink ejection systems 32, 34. In one embodiment, media transport 30 may be configured to transporter move individual sheets of porous media. In another embodiment, media transport 30 may be configured to move a web of porous media. In one embodiment, media transport 30 include media contacting and engaging mechanisms such as rollers, belts and alike which position media upon a platen opposite the ejection systems. In another embodiment, media transport 30 may comprise a cylinder or drum about which the sheet or web of print media is supported.

Ink ejection system 32, 34 comprise mechanisms configured to selectively eject or deposit printing ink onto print medium 22. In one embodiment, each of ink ejection systems 32, 34 includes a multitude of nozzles 50 through which ink is ejected. In the example illustrated, ink ejection system 32 includes a first set 52 of nozzles 50 (the number and configuration of which are schematically shown) for ejecting ink provided by ink supply 36 and a second set 54 of nozzles 50 for ejecting ink supplied by ink supply 38 and a third set of nozzles 56. For ejecting ink supplied by ink supply 40. Likewise, ink ejection system 34 includes a first set of nozzles 58 for ejecting ink supply by ink supply 42 and a second set of nozzles 60 for ejecting ink supplied by ink supply 44. According to one embodiment, each of ink ejection systems 32, 34 comprise thermoresistance inkjet print heads. In another embodiment, each of ink ejection systems 32, 34 may comprise other ink ejecting mechanisms such as tea is a resistive inkjet print heads. Although the sets 52-60 of nozzles 50 are illustrated as being apportioned among the two ink ejection system 32, 34, in other embodiments, these sets 52-60 of nozzles 50 and alternatively be provided by a single ink ejection system or be apportioned among greater than two ink ejection systems.

Ink supplies 36-44 deliver or supply ink to the nozzles 50 of ink ejection system 32, 34. In one embodiment, ink supply 36-44 may comprise cartridges, tanks or other containers remote from fluid ejection systems 32, 34, wherein a tube or other conduits delivering from the ink supply to the fluid ejection system. For example, in one embodiment, ink supplies 36-44 may comprise "off-axis" ink supplies. In another embodiment, ink supplies 36-44 may comprise compartments or chambers mounted to or provided as part of ink ejection systems 32, 34. For example, in one embodiment, ink ejection systems 32, 34 and their associated ink supplies 36-44 may be provided by one or more integrated cartridges having both nozzles 50 and one or more of the fluid supplies 36-44.

In the example illustrated, ink ejection system 32 and its associated ink supplies 36-40 supply and eject different chromatic inks onto print medium 22. In the example illustrated, ink supplies 36, 38 and 40 supply cyan, magenta and yellow inks, respectively to nozzles sets 52-56 of ink ejection system 32. In other embodiments, ink ejection system 32 may be provided with additional nozzles sets and may be supplied with different or additional chromatic inks from additional ink supplies. Examples of additional or alternative chromatic inks include light or dark yellow, light or dark cyan or light or dark magenta inks. In the example illustrated, each of the chromatic inks supplied by ink supply 36-40 are pigment-based inks. In other embodiments, the inks of supplies 36-38 may alternatively be dye-based inks. In embodiments where printing system 20 does not print color images, ink ejection system 32 and ink supplies 36-40 may be omitted.

Ink supplies 42, 44 supply different pigment-based inks which are deposited by sets 58, 60 of nozzles 50, respectively, such that the different pigment-based inks mix with one another at each image black portion or overlap one another to form dark or black portions of an image, the black portions having a dark, rich and appealing black point. In other words, rather than black portions of the image being formed from a single black ink, black portions of the image are formed from the two different pigment-based inks separately printed upon a media, one being a black ink and the other being a grayscale ink (including black ink and gray ink). In some embodiments, the black ink or grayscale ink may include a small amount of cyan or magenta, limited so as to not produce a substantial hue shift. As will be described hereafter, the particular combination of pigment-based inks supplied by ink supplies 42, 44 provide black portions of the image with improved contrast and dynamic range as well as having an improved (lower) L* min value. The manner by which the different pigment-based inks from ink supplies 42 and 44 are deposited is further controlled to further reduce the L* min value of the black portions of the image.

Actuator 46 comprises one or more mechanisms configured to move or scan ink ejection systems 32, 34 across or relative to media transport 30 as well as print medium 22. In one embodiment, actuator 46 may comprise a motor configured to drive a belt or cable couple to a carriage supporting ink ejection system 32, 34. As ink ejection systems 32, 34 are moved or scanned across a print medium 22, ink is ejected onto print medium 22. Between such scans, media transport 30 may further be indexing or moving media 22 in a direction substantially orthogonal to the direction which actuator 46 is moving ink ejection system 32, 34. In other embodiments, actuator 46 may have other configurations or may be omitted. For example, in embodiments where ink ejection systems 32, 34 are alternatively configured to completely span a dimension of print medium 22, such as with a page-wide-array printer, actuator 46 may be omitted.

Controller 48 comprises one or more processing units configured to generate control signals controlling and directing movement of print medium 22, movement of ink ejection system 32, 34 by actuator 46 (unless ink ejection systems 32, 34 are part of the page-wide-array) and the ejection of ink onto print medium 22 by nozzles 50. Controller communicates with media transport 30, ink ejection system 32, 34 and actuator 46 in a wired or wireless fashion. By controlling the manner in which they pigment-based inks supplied by ink supplies 42 and 44 are deposited, controller 48 may further reduce the black point or L* min value of the image pixel.

For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 48 may be embodied as part of one or more application-specific integrated circuits (ASICs). Unless otherwise specifically noted, the controller is not limited to any specific combination of hardware circuitry and software, nor to any particular source for the instructions executed by the processing unit.

Figure 2:
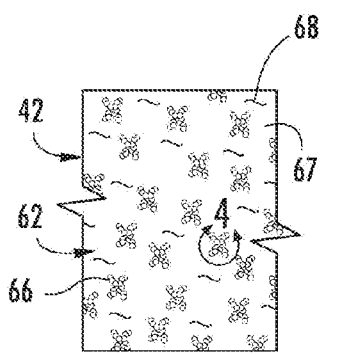
FIG. 2 is a schematic illustration of a first ink of the system of FIG. 1 according to an example embodiment.
Figure 3:
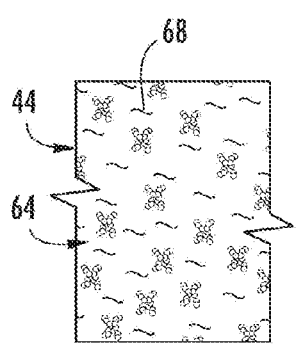
FIG. 3 is a schematic illustration of a second ink of the system of FIG. 1 according to an example embodiment.

FIGS. 2 and 3 illustrate ink supplies 42 and 44 in more detail. In particular, FIG. 2 schematically illustrates ink 62 within ink supply 42 white FIG. 3 schematically illustrates ink 64 within ink supply 44. Ink 62 within ink supply 42 comprises carbon black pigment units 66 in a liquid vehicle or carrier medium 67 including binder 68. In one embodiment, the carbon black pigment units 66 may comprise resin dispersed pigments. In yet other embodiments, the carrier medium 67 may include dispersants or surfactants which bind to a surface of the pigment, providing stability to the pigment dispersion.

Binder 68 enhances the gloss and durability of an ink spot, dot or black portion formed with ink 62. In the example illustrated, binder 68 comprises a polyurethane binder. In one embodiment, the polyurethane binder may alternatively comprise any polyurethane binder having a weight average molecular weight from 32K to 50K. In other embodiments, binder 68 may comprise other polymer binders or polymer-based binders.

In addition to binder 68, the carrier medium of ink 62 may comprise additional additives or ingredients such as surfactants, dispersants, pH adjusters, buffers, humectants, antioxidants, solubilizers, ultraviolet absorbers, anti-corrosion additives, anti-kogation additives, or biocides.

Pigment units 66 are generally insoluble in the carrier medium of ink 62, but are dispersed/suspended in the form of small particles. Pigment units 66 have a particle size, particle size distribution and/or morphology such that ink 62 has at least a medium structure, a fast rate of agglomeration and a large aggregate particle size. For purposes of this disclosure, the term "high structure" refers to a pigment having a dibutylphthalate absorption number (DBP number) of at least 95 cc/100 g per ISO 4656 or similar test methods. In one embodiment, pigment units 66 have a median DBP number of between 95 cc/100 g and 105 cc/100 g, per ISO 4656 or similar test methods. In one embodiment, pigment units 66 of ink 62 have a large aspect ratio with a median dimension of at least 90 nm. In one embodiment, pigment units 66 of ink 62 have a median dimension of between 90 nm and 110 nm. Because ink 62 includes such high structure pigment units, ink 62 may offer several benefits over lower structured pigment units, such as improved disperability and reduced degradation of thermoresistance inkjet print head firing resisters over time. In the example illustrated, ink 62 has a ratio of pigment units 66 to binder 68 of greater than one and nominally at least 3 to 1.

Figure 4:
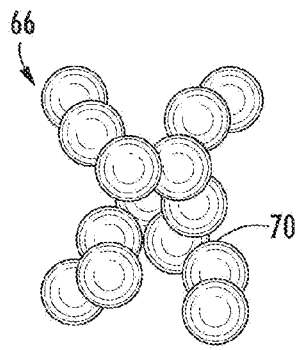
FIG. 4 is a schematic illustration of a structured pigment unit of the ink of FIG. 2 taken along line 4-4 according to an example embodiment.
Figure 5:
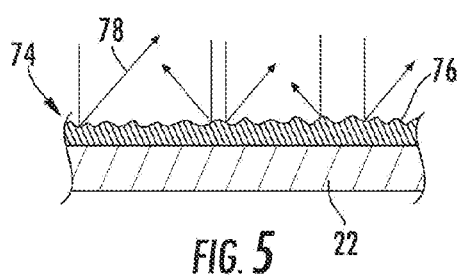
FIG. 5 is a schematic illustration of a black image black portion formed from the ink of FIG. 2 according to an example embodiment.

Ink 64 is similar to ink 62 except that ink 64 has a smaller ratio of pigment units 66 to binder 68. In one embodiment, ink 64 has a binder to pigment ratio of at least 1 to 1 and nominally at least 1.75 to 1. In one embodiment, ink 64 has a binder to pigment ratio of at least 2.5 to 1. Although ink 64 is described as having pigment units 66 identical to the pigment units 66 found in ink 62, in other embodiments, ink 64 may have different pigment units. In addition, other aspects of the liquid carrier 66 of ink 64 (besides a ratio of binder to pigment) may be different from ink 62. For example, in one embodiment, ink 64 has an acrylic and polyurethane based binder As noted above, pigment units 66 have a large degree of structure, having a medium to high structure so as to be bulkier or no as to have a larger aspect ratio. FIG. 4 illustrates one example of a single pigment unit. As shown by FIG. 4, in contrast to low structure pigment, pigment unit 66 is not spherical, but includes tentacles, fingers, protruberances or projections 70. As shown by FIG. 5, when an ink dot or black portion 74 consisting of ink 62 is deposited upon porous print media 22, the black portion 74 has a rough surface 76. Surface 76 is believed to be rougher as compared to black portions formed from an ink having pigment with tower structure. It is believed that this rougher surface 76 causes light 78 to be reflected with greater diffusion or scattering. As a result, black portion 74 has a tighter relatively black point or a higher L* min value. Increasing the percentage of carbon black units 66 in the ink 62 deposited upon medium 22 does not necessarily lower the L* value but may actually increase the L* min value.

Figure 6:
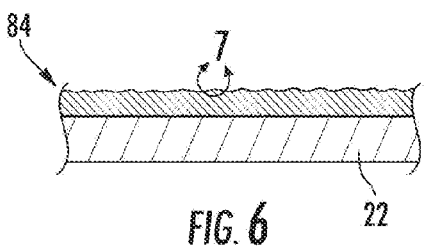
FIG. 6 is a schematic sectional view of a black portion a media of FIG. 1 taken along line 6-6 according to an example embodiment.
Figure 7:
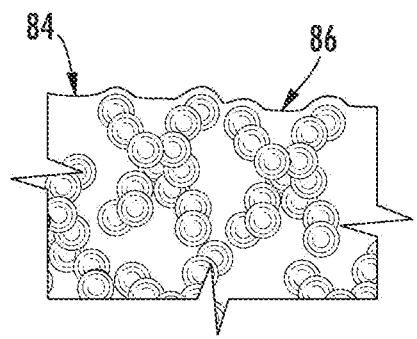
FIG. 7 is an enlarged fragmentary view of the black portion of the media of FIG. 6 taken along lines 7-7 according to an example embodiment.

FIGS. 6 and 7 schematically represent black portion 84 printed or deposited upon porous media 22. Black portion 84 is formed by separately ejecting both inks 62 and 64 upon media 22, wherein the ink spots at least partially overlap. As a result, some degree of mixing of inks 62 and 64 occurs.

In one embodiment in which ink ejection system 34 is scanned across print media 22 by actuator 46 under the control of controller 48, inks 62 and 64 are deposited upon print media 22 during a same pass or scan of ink ejection system 34 across the media. In one embodiment, ink 62 from a nozzle 50 of nozzle set 58 is ejected onto print media 22. Almost immediately thereafter, during the same pass of ink ejection system 34 across the media, ink 64 is ejected from a nozzle 50 of nozzle set 60 on top of the deposited ink 62 to form a black portion of the image.

In another embodiment in which nozzle sets 58 and 60 are part of a page-wide-array arrangement of one or more printheads, ink 62 is deposited upon print media 22 in the location and size corresponding to an ink spot, dot or pixel. Almost immediately thereafter, media transport 30 indexes the print media to position the same general portion opposite a nozzle 50 of nozzle sets 60, wherein ink 64 is deposited at least partially on top of the previously ejected ink 62. The deposition of ink 64 on top of ink 62 to form the black portion occurs prior to substantial absorption of ink 62 by porous media 22.

FIG. 7 schematically illustrates surface 86 of black portion 84 in more detail. As shown by FIG. 7, because ink 64 has a greater percentage of binder or a greater binder to pigment ratio as compared to ink 62, binder 68 is believed to at least partially fill in voids between projections 70 of pigment units 66. As a result, surface 86 of the individual black portion 84 is smoother or less rough. Thus, despite the addition of a lighter ink 64, such as a medium gray ink 64, to ink 62 having a greater percentage of carbon black portion units, the resulting black portion 84 has a darker and richer black point (a lower L* min value) as compared to a black portion formed from ink 62 alone or formed from a black portion including even a greater percentage of pigment units 66. At the same time, as noted above, the more structured pigment units 66 provide enhanced dispersability and less firing resistance degradation as compared to less structured pigment units 66.

Because inks 62 and 64 are separately ejected by different nozzles, the total solids load of pigment and binder during each ejection of ink is sufficiently low so as to reduce viscosity issues which might otherwise reduce jetting reliability at lower ink dropweights (the amount of ink jetted in each drop). In one embodiment, the total solids (pigment and binder) of inks 62 and 64 is less than or equal to 5% for a 4 ng dropweight. In other embodiments, the percent drop weight may be higher (i.e. 6 ng or 9 ng drop weight) when ejecting inks having a larger percentage of total solids; however, the larger drop weight may increase dot visibility and graininess of the image.

According to one example embodiment, controller 48 generates control signals causing ink ejection system 34 to deposit a relatively low density of ink 62 on black portions of the image as compared to a density of ink 64 on the same black portions. According to one embodiment, ink 62 is deposited in an amount of at least 5% of absorption capacity of the porous print media 22 while ink 64 is deposited in an amount of at least 87% of the absorption capacity of porous media 22. In one embodiment where print media 22 has a 180 ng/300×300 pixel per inch area absorptive capacity for inks 62 and 64, ink 62 is deposited in an amount between 10 and 23 ng. Ink 64 is deposited in an amount between 157 and 170 ng. In another embodiment, ink in an amount of at least 70 percent of the absorptive capacity of the medium (at least about 130 ng for a medium having an absorptive capacity of 180 ng/300×300 pixel per inch area for inks 62 and 64) is deposited, with at least 54% of the total ink deposited being ink 64. In one embodiment, the L* min value is enhanced when an amount of ink substantially equal to the absorptive capacity of the media (about 180 ng/300×300 pixel per inch area) of inks 62 and 64 are ejected on medium 22 with at least 166.5 ng (or 92%) of the total ejected ink being ink 64. As a result, black portion 84 has an enhanced black point with a lower L* min value.

Figure 8:
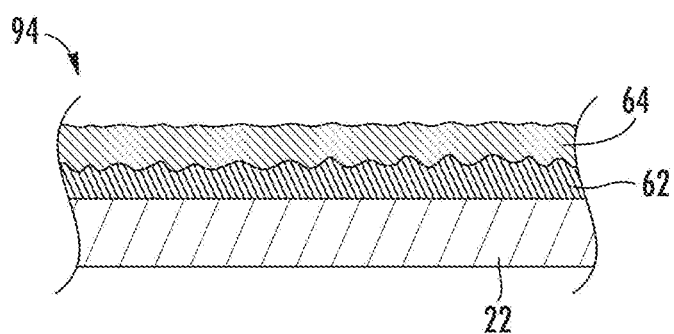
FIG. 8 is a schematic sectional view of another black portion of the media of FIG. 1 taken along line 8-8 according to an example embodiment.

FIG. 8 schematically illustrates black portion 94 formed by the deposition of inks 62 and 64 upon porous media 22. Black portion 94 is similar to black portion 84 in that black portion 94 is formed using both inks 62 and 64. However, unlike black portion 84, black portion 94 is formed by depositing or printing ink 64 on top of ink 62 after the deposited ink 64 has been completed or at least substantially absorbed by print media 22 or has completely or at least substantially dried. In other words, ink 64 is deposited upon ink 62 without mixing or substantial mixing of inks 62 and 64. As a result, ink 64, which includes a lower concentration of pigment units 66 as compared to ink 62, does not mix or mixes to a lesser extent with ink 62 so as to form a more uniform or homogeneous layer of ink 64 on top of the layer of ink 62. Because the layer of ink 64 is more homogenous, the layer more completely covers the layer of ink 62 to smoothen the roughness caused by the use of medium to high structure pigment unit 66. In one embodiment, it has been found that because controller 48 controls ink ejection system 34 so as to delay the deposition of ink 64 on ink 62 until ink 62 has had additional time to be absorbed by the porous media 22 or so as to dry, black portion 94 has a darker black point, additionally reducing the L* value as compared to when ink 64 is deposited upon ink 62 prior to substantial absorption or drying of ink 62.

In embodiments where ink ejection system 34 is scanned across print media 22 by actuator 46, controller 48 generates control signals causing ink 62 to be deposited upon porous media 22 (directly in contact with the surface of porous media 22) during a first pass of ink ejection system 34 across print media 22. Controller 48 further generates control signals causing ink ejection system 34 to deposit ink 64 on ink 62 during a different subsequent pass or scan of ink ejection system 34 across print media 22. The time difference between the different passes of ink ejection system 34 across print media 22 is sufficient for substantial absorption of the deposited ink 62 to occur or for the deposited ink 62 to substantially dry. In one embodiment, ink 64 is deposited upon ink 62 at a particular black portion at a time of at least 0.2 seconds (the turnaround time at an end of each pass) after completion of the initial deposition of ink 62 in an overlapping fashion with respect to the same black portion location.

In embodiments where ink ejection system 34 is part of a page-wide-array printing system, this delay between the deposition of ink 62 and the deposition of ink 64 to form a single black portion may be achieved by the delaying the indexing of print media 22 by media transport 30 or may be achieved by delaying the ejection of ink 64 by nozzle 50 of nozzle set 60. In embodiments where the media supported and transported by a drum, this delay may be achieved by depositing ink 64 during a subsequent revolution of the drum and the supported print media.

Figure 9:
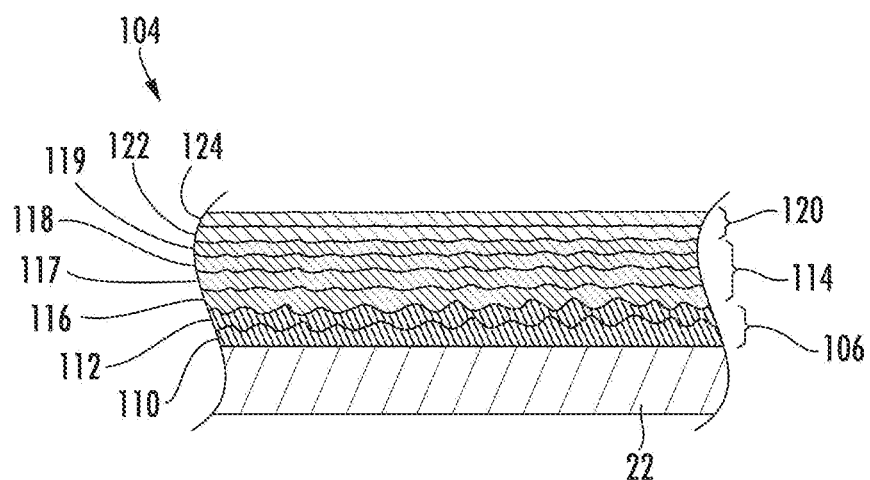
FIG. 9 is a schematic sectional view of another embodiment of a black portion of the media of FIG. 1.

FIG. 9 schematically illustrates an image black portion 104 form by printing system 20. Image black portion 104 is formed with eight individual depositions of ink. In embodiments where ink ejection system 34 scanned across print media 22, black portion 104 is formed by eight passes or scans of ink ejection system 34. As shown by FIG. 9, during an initial two passes 106 of ink ejection system 34, layers 110 and 112 of ink 62 are ejected or deposited onto porous print media 22. During these initial two passes, ink 64 is not deposited.

During the next four subsequent passes 114 of ink ejection system 34 across print media 22, layers 116-119 are ejected upon layer 112. One of layers 116-119 is formed during each pass. Each layer 116-119 is formed by ejecting both inks 62 and ink 64 during the same pass. Because inks 62 and 64 are deposited or ejected during the same pass, mixing of ink 62 and 64 takes place in each of layers 116-119.

During the last two passes 120, layers 122 and 124 are formed by ejecting ink 64 at the image black portion 104. During the final two passes, ink 62 is not deposited. Because layers 122 and 124 are formed or deposited in passes different than the previous passes in which layer 119 was formed, layer 119 is provided with time to be substantially absorbed or to substantially dry prior to the deposition of layer 122. As a result, ink 64, which includes a lower concentration of pigment units 66 as compared to ink 62, does not mix or mixes to a lesser extent with ink 62 so as to form a more uniform or homogeneous layer of ink 64 on top of the layer of ink 62. Because the layer of ink 64 is more homogenous, the layer more completely covers the mixed layer of inks 62 and 64 to smoothen the roughness caused by the use of pigment unit 66. In one embodiment, it has been found that because controller 48 controls ink ejection system 34 so as to delay the deposition of ink 64 on ink 62 until ink 62 has had additional time to be absorbed by the porous media 22 or so as to dry, black portion 94 has a darker black point, reducing the L* min value to a greater degree. The black point or L* min value may be further reduced by adding additional layers of ink 64 (without ink 62) on top of the mixed layers.

In other embodiments, each black portion of an image may be formed by depositing inks 62 and 64 in other manners. For example, image black portion 104 may include additional homogenous layers of ink 62 such as additional layer similar to layers 110 and 112. Image black portion 104 may include a greater or fewer of such mixed layers 116-119. Likewise, image black portion 104 may include a single layer of just ink 64 or more than two layers of just ink 64. In yet another embodiment, image black portion 104 may alternatively omit the mixed layers 116-119. In still another embodiment, image black portion 104 may alternatively omit layers 110 and 112. In yet an additional embodiment, image black portion 104 may omit layers 122 and 124.

EXAMPLE

According to one embodiment, ink 62 comprises: 3% colorant, 16% solvents and 0.6% surfactants. Ink 64 comprises: 1% colorant, 12% solvents and 0.4% surfactants. Although the specific formulations of inks 62 and 64 may vary, according to one example embodiment, Example Inks 62 and 64 may have the following compositions:

| Component | Example Ink 62 | Example Ink 64 | function |
|---|---|---|---|
| Dantocol DHE | 11 | 8 | co-solvent |
| 1-(2-Hydroxyethyl)-2-pyrrolidone | 0.75 | 0 | co-solvent |
| 1,2 Hexanediol | 0.8 | 0.26 | humectant |
| Glycerol propoxylate (Sannix GP600) | 0 | 2 | co-solvent |
| Triethanol Amine | 0.5 | 0.8 | buffer |
| Sodium Lauryl Sulfate | 0.24 | 0.25 | surfactant |
| Surfynol 440 | 0.35 | 0.175 | surfactant |
| Megaface F444 | 0.065 | 0.065 | surfactant |
| Proxel GXL biocide | 0.02 | 0.02 | biocide |
| Kordek MLX biocide | 0.014 | 0.014 | biocide |
| polyurethane resin | 1 | 1.71 | polymer/resin/binder |
| Joncryl 683, styrene acrylic resin | 0 | 0.73 | polymer/resin/binder |
| 2-Pyrrolidinone (from Joncryl resin) | 0 | 0.73 | co-solvent |
| Diethylene glycol (most is from pigment) | 3.40 | 1.12 | co-solvent |

-continued

| Component | Example Ink 62 | Example Ink 64 | function |
|---|---|---|---|
| Water | balance | balance | solvent |
| Pigment total | 3 | 0.96 | Total amount of pigment |
| black pigment | 2.093 | 0.67 | pigment |
| cyan pigment | 0.564 | 0.1804 | pigment |
| violet pigment | 0.344 | 0.1101 | pigment |

Figure 10:
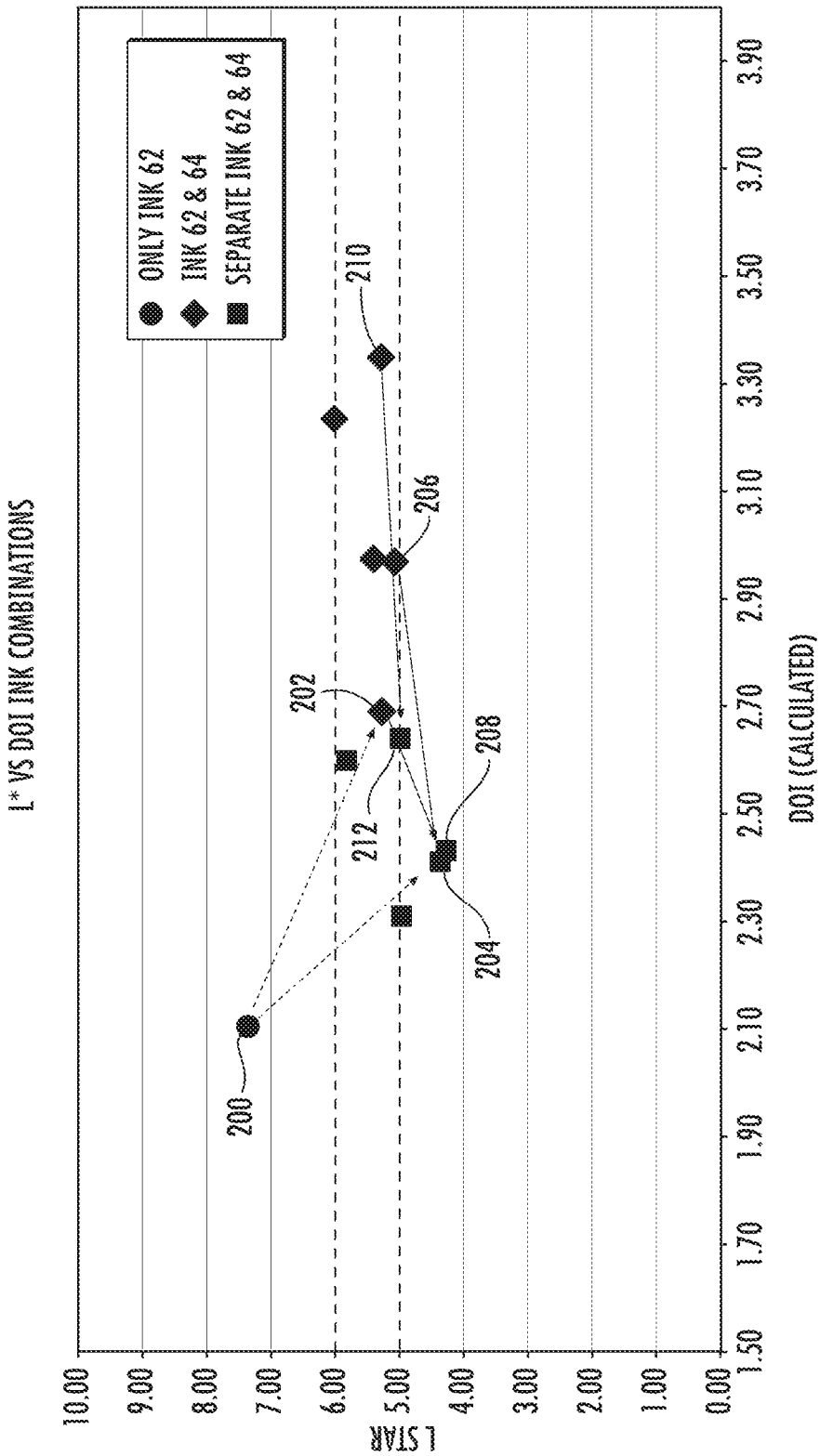
FIG. 10 is a graph comparing black points of different black portions printed using different combinations of ink with different printing protocols.

FIG. 10 is a graph identifying a black point or L* min value of individual black image pixels and their associated distinctness of image (contrast, dynamic range) (DOI) for different deposited ratios of inks 62 and 64 using different deposition methods. Point 200 identifies the L* min value of an image black portion formed by deposition of the example ink 62 without the example ink 64. Data point 202 identifies the L* min value of an image black portion formed by the deposition of both example inks 62 and 64, wherein the image black portion is formed from 23 ng of the example ink 62 and 148 ng of the example ink 64 deposited on top of the example ink 62 during a single pass of ink ejection system 34 (shown in 1). Data point 204 identifies the L* min value of an image black portion formed by the deposition of both example inks 62 and 64, wherein the image black portion is formed from 23 ng of the example ink 62 and wherein 148 ng of the example ink 64 is deposited on top of the example ink 62 during a separate pass of ink ejection system 34 (shown in 1). As shown by data points 200 and 202, the additional deposition of the example ink 64 on top of the example ink 62 during the same pass results in the L* min value of the black portion falling from above seven to below six. As shown by data points 202 and 204, when the example ink 64 is deposited on top of the example ink 62 during a separate pass such that the previously deposited example ink 62 has additional time for absorption or drying, the L* min value is further reduced from just above five to below five, nearing four. Similar results are achieved with other ratios of inks 62 and 64.

Data point 206 identifies the L* min value of an image black portion formed by the deposition of both example inks 62 and 64, wherein the image pixels form from 14 ng of the example ink 62 and 166 ng of the example ink 64 deposited on top of the example ink 62 during a single pass of ink ejection system 34 (shown in 1). Data point 208 identifies the L* min value of an image black portion formed by the deposition of both example inks 62 and 64, wherein the image black portion is formed from 14 ng of the example ink 62 and wherein 166 ng of the example ink 64 is deposited on top of the example ink 62 during a separate pass of ink ejection system 34 (shown in 1).

Data point 210 identifies the L* value of an image black portion formed by the deposition of both example inks 62 and 64, wherein the image pixels form from 10 ng of the example ink 62 and 166 ng of the example ink 64 deposited on top of the example ink 62 during a single pass of ink ejection system 34 (shown in 1). Data point 212 identifies the L* min value of an image black portion formed by the deposition of both example inks 62 and 64, wherein the image black portion is formed from 10 ng of the example ink 62 and wherein 166 ng of the example ink 64 is deposited on top of the example ink 62 during a separate pass of ink ejection system 34 (shown in 1). Overall, depositing the example ink 64 on the example ink 62 during separate passes decreased the L* min value by an average of 0.7.

In other embodiments, other proportions of the example inks 62 and 64 may be used. For example, ink in an amount of at least 70 percent of the absorptive capacity of the medium (at least about 130 ng for a medium having an absorptive capacity of 180 ng for example inks 62 and 64) is deposited, with at least 54% of the total ink deposited being example ink 64. In one embodiment, the L* min value is enhanced when an amount of ink substantially equal to the absorptive capacity of the media (about 180 ng/300×300 pixel per inch area) of inks 62 and 64 are ejected on medium 22 with at least 166.5 ng (or 92%) of the total ejected ink being example ink 64.

Although the present disclosure has been described with reference to example embodiments, workers skilled in the art wilt recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompasses a plurality of such particular elements.

What is claimed is:

1. A method of printing comprising:
depositing a first ink including first carbon black pigment units and a first binder upon a print medium, the first carbon black pigment units having a median dibutylphthalate absortion (DBP) of at least 95 cc/100 g, the first ink having a first ratio of the first carbon black pigment units to the first binder; and
depositing on the print medium a second ink including second carbon black pigment units and a second binder, the second ink having a second ratio of the second carbon black pigment units to the second binder less than the first ratio, wherein the first ink and the second ink together have a median total weight per unit area is of at least 70 percent of an absorptive capacity of the print medium and overlap one another, and wherein the second ink is at least 54 percent of the total weight per unit area.

2. The method of claim 1, wherein the first ratio is at least 3 to 1.

3. The method of claim 2, wherein the second ratio is less than 1 to 3.

4. The method of claim 1, wherein the first ink is deposited in an amount of at least 5 percent of an absorption capacity of the print medium for the first ink and the second ink and wherein the second ink is deposited in an amount of at least 87 percent of the absorption capacity of the print medium for the first ink and the second ink.

5. The method of claim 1, wherein the second carbon black pigment units have a median dibutylphthalate absortion (DBP) of at least 95 cc/100 g.

6. The method of claim 1, wherein the first carbon black pigment units have a median unit dimension of at least 90 nm.

7. The method of claim 6, wherein the second ink is deposited on and in contact with the first ink prior to the first ink being substantially absorbed by the print medium such that the second ink and the first ink substantially mix.

8. The method of claim 6, wherein the second ink is deposited on and in contact with the first ink after the first ink has been substantially absorbed by the print medium.

9. The method of claim 1, wherein a black image black portion is formed having a L* min value of less than 6.

10. A printed media comprising:
a print medium;
a first ink, the first ink including first carbon black pigment units and a first binder upon the print medium, the first carbon black pigment units having a median dibutylphthalate absortion (DBP) of at least 95 cc/100 g, the first ink having a first ratio of the first carbon black pigment units to the first binder; and
a second ink including second carbon black pigment units and a second binder, the second ink having a second ratio of the second carbon black pigment units to the second binder less than the first ratio, wherein the first ink and the second ink together have a median total weight per unit area of at least 70 percent of an absorptive capacity of the print medium and overlap one another, and wherein the second ink is at least 54 percent of the total weight per unit area.

11. The printed media of claim 1, wherein the first ratio is at least 3 to 1.

12. The printed media of claim 2, wherein the second ratio is less than 1 to 3.

13. The printed media of claim 1, wherein the second carbon black pigment units have a median dibutylphthalate absortion (DBP) of at least 95 cc/100 g.

14. The printed media of claim 1, wherein the first carbon black pigment units have a median unit dimension of at least 90 nm.

15. A printing apparatus comprising:
a media transport;
a first ink ejector connected to a first ink supply containing a first ink including first carbon black pigment units and a first binder, the first carbon black pigment units having a median dibutylphthalate absortion (DBP) of at least 95 cc/100 g, the first ink having a first ratio of the first carbon black pigment units to the first binder;
a second ink ejector connected to a second ink supply containing a second ink including second carbon black pigment units and a second binder, the second ink having a second ratio of the second carbon black pigment units to the second binder less than the first ratio; and
a controller in communication with the media transport, the first ink ejector and the second ink ejector, the control are being configured to generate control signals (1) directing the first ink ejector to deposit the first ink on a print medium supported by the media transport and (2) directing the second ink ejector to deposit the second ink on and in contact with the first ink, wherein the first ink and the second ink together have a median total weight per unit area of at least 70 percent of an absorptive capacity of the print medium and overlap one another, and wherein the second ink is at least 54 percent of the total weight per unit area.

* * * * *